(12) United States Patent
Maeng et al.

(10) Patent No.: US 9,692,779 B2
(45) Date of Patent: Jun. 27, 2017

(54) DEVICE FOR QUANTIFYING VULNERABILITY OF SYSTEM AND METHOD THEREFOR

(71) Applicant: ELECTRONICS AND TELECOMMUNICATIONS RESEARCH INSTITUTE, Daejeon (KR)

(72) Inventors: Young-Jae Maeng, Daejeon (KR); Jong-Hu Lee, Daejeon (KR); Hyun-Dong Park, Daejeon (KR); Sang-Woo Park, Daejeon (KR); Eung-Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 74 days.

(21) Appl. No.: 14/779,435

(22) PCT Filed: Oct. 21, 2013

(86) PCT No.: PCT/KR2013/009389
§ 371 (c)(1),
(2) Date: Sep. 23, 2015

(87) PCT Pub. No.: WO2014/157797
PCT Pub. Date: Oct. 2, 2014

(65) Prior Publication Data
US 2016/0057164 A1    Feb. 25, 2016

(30) Foreign Application Priority Data
Mar. 26, 2013  (KR) .................. 10-2013-0031955

(51) Int. Cl.
*G06F 21/56* (2013.01)
*H04L 29/06* (2006.01)
(Continued)

(52) U.S. Cl.
CPC ...... *H04L 63/1433* (2013.01); *G06F 17/5009* (2013.01); *G06F 21/56* (2013.01); *G06F 21/577* (2013.01); *H04L 63/10* (2013.01)

(58) Field of Classification Search
CPC .......................... G06F 21/56; H04L 63/1433
See application file for complete search history.

(56) References Cited

U.S. PATENT DOCUMENTS

2002/0147803 A1 *  10/2002  Dodd ................. G06F 21/577
                                                                709/223
2006/0129810 A1    6/2006  Jeong et al.
(Continued)

FOREIGN PATENT DOCUMENTS

KR   10-2004-0027101 A   4/2004
KR   10-2006-0067124 A   6/2006
(Continued)

*Primary Examiner* — David Pearson
(74) *Attorney, Agent, or Firm* — LRK Patent Law Firm

(57) ABSTRACT

A method and apparatus for quantifying the vulnerability of a system. The apparatus includes a vulnerability calculation unit, a target organization security level calculation unit, a network separation status calculation unit, an interim calculation unit, and a final score calculation unit. The vulnerability calculation unit converts each of the vulnerability identification results of the system into a vulnerability score. The target organization security level calculation unit calculates a target organization security level score based on a technology-field security level score and a management-field security level score. The network separation status calculation unit converts the status of the separation of the local network of the system into a network separation score. The interim calculation unit calculates an interim score. The (Continued)

final score calculation unit quantifies the vulnerability of the system by finally calculating a composite score using the interim score and a simulated intrusion success level.

9 Claims, 4 Drawing Sheets

(51) Int. Cl.
*G06F 21/57* (2013.01)
*G06F 17/50* (2006.01)

(56) References Cited

U.S. PATENT DOCUMENTS

| | | | |
|---|---|---|---|
| 2008/0172347 A1* | 7/2008 | Bernoth | H04L 63/0263 706/12 |
| 2009/0024627 A1 | 1/2009 | King | |
| 2009/0024663 A1 | 1/2009 | McGovern | |
| 2009/0106843 A1 | 4/2009 | Kang et al. | |
| 2009/0293100 A1 | 11/2009 | Kang et al. | |
| 2009/0326899 A1* | 12/2009 | Ghorbani | H04L 63/1433 703/13 |
| 2012/0151594 A1 | 6/2012 | McClure et al. | |
| 2014/0189873 A1* | 7/2014 | Elder | G06F 21/577 726/25 |

FOREIGN PATENT DOCUMENTS

| | | |
|---|---|---|
| KR | 10-0851521 B1 | 8/2008 |
| KR | 10-2009-0003034 A | 1/2009 |
| KR | 10-2009-0013099 A | 2/2009 |
| KR | 10-2009-0039524 A | 4/2009 |
| KR | 10-2009-0121466 A | 11/2009 |
| KR | 10-2011-0130203 A | 12/2011 |
| KR | 10-1189967 B1 | 10/2012 |

* cited by examiner

| NETWORK SEPARATION STATUS | SCORE |
|---|---|
| PHYSICAL SEPARATION, AND NO CONNECTION BETWEEN NETWORKS | 1.0 |
| PHYSICAL SEPARATION, AND CONNECTION BETWEEN SPECIFIC RESOURCES OF NETWORKS | 0.9 |
| LOGICAL SEPARATION, AND NO CONNECTION BETWEEN NETWORKS | 0.8 |
| LOGICAL SEPARATION, AND CONNECTION BETWEEN SPECIFIC RESOURCES OF NETWORKS | 0.7 |
| NO SEPARATION | 0.6 |

FIG. 2

| INTRUSION RESULTS \ INTRUSION ATTEMPT LOCATION | OUTSIDE (INTERNET) | ANOTHER SYSTEM WITHIN ORGANIZATION | SAME SYSTEM |
|---|---|---|---|
| ACQUISITION OF ADMINISTRATOR AUTHORITY | LEVEL 1 | LEVEL 2 | LEVEL 2 |
| ACQUISITION OF USER AUTHORITY | LEVEL 1 | LEVEL 2 | LEVEL 3 |
| POSSIBLE OBSTRUCTION OF NORMAL OPERATION | LEVEL 1 | LEVEL 3 | LEVEL 4 |

FIG. 3

| INTERIM SCORE | SIMULATED INTRUSION SUCCESS LEVEL | COMPOSITE SCORE |
|---|---|---|
| 94 | LEVEL 1 | 94 x 80% = 75.2 |
| | LEVEL 2 | 94 x 85% = 79.9 |
| | LEVEL 3 | 94 x 90% = 84.6 |
| | LEVEL 4 | 94 x 95% = 89.3 |
| | SIMULATED INTRUSION WAS IMPOSSIBLE | 94 x 100% = 94 |

DEVICE FOR QUANTIFYING VULNERABILITY OF SYSTEM AND METHOD THEREFOR

TECHNICAL FIELD

The present invention relates, in general, to an apparatus and method for quantifying the vulnerability of a system and, more particularly, to an apparatus and method that quantify the vulnerability of a system in order to intuitively and objectively represent the state of the system.

BACKGROUND ART

Technology for analyzing and evaluating the vulnerability of information and communication systems is intended to previously identify vulnerabilities that exist in the corresponding system and eliminate the vulnerabilities based on the results of the identification. Accordingly, technology for analyzing and evaluating the vulnerability of information and communication systems enables vulnerabilities to be eliminated before being exploited for illegitimate intrusions, thereby preventing various types of intrusions from occurring. Furthermore, the results of analyzing or evaluating the vulnerability of a system are used for a method of intuitively transferring the security state of the system to the management of a corresponding organization.

Korean Patent No. 0851521 discloses technology related to a cyber attack system and method for providing an active and automated integrated cyber attack model that is capable of detecting and analyzing the vulnerability of a network or a system as security technology for a network system.

However, this conventional technology for analyzing or evaluating vulnerability provides merely an active and automated integrated cyber attack model that is capable of detecting and analyzing the vulnerability of a network or a system, but does not disclose technology for acquiring the results of intuitively or objectively evaluating vulnerability.

Meanwhile, if the results of analyzing or evaluating the vulnerability of a system are not quantified, it is difficult to represent the state of the system using a representative value.

Furthermore, the analysis or evaluation of vulnerability is not performed once, but is periodically performed in general. When the results of a task that is periodically performed are represented, it is necessary to indicate the comparisons between current results and past results, as well as the current results. For example, the result statement "a specific system is in a dangerous state because access control is insufficient because of lack of password management and the presence of an unnecessary service" may make a user confused. In this case, a result statement based on quantification may be provided. That is, a current status can be intuitively and objectively provided by describing the current status while comparing the current status with a past status, despite no provision of a detailed description, as in the result statement "the vulnerability has increased because the past status was 85 points (a superior level) two years ago and the current status is 77 points (an insufficient level).

Although it is definitely necessary to analyze or evaluate vulnerability, related research and development has not been sufficiently carried out. A first reason for this is related to a request to modify the results of analyzing or evaluating vulnerability. System administrators often make requests to modify results that are calculated after a vulnerability has been identified and then the possibility of the malicious exploitation of the vulnerability is determined via simulated intrusions. That is, the system administrators make a request to modify results because they may not desire that a low score be reported to the management or may desire that a lower score be reported to the management, so that they can use the lower score to request an increase in resources, such as a higher budget or extra personnel, from the management based on the reported lower score. A second reason is that there have been no attempts to implement a method of quantifying vulnerability and simulated intrusion results and a method of guaranteeing that the former method has objectivity.

Although the results of analyzing or evaluating vulnerability have been quantified using specific methods, the objectivity thereof cannot be accomplished. A first reason for this is that the types of vulnerability that are used to calculate the score are limited. That is, since only a few types of characteristic vulnerabilities that exert great influence when being maliciously used and that are selected from identified vulnerabilities are used, other types of vulnerability are excluded from the calculation of the score. A second reason for this is that the subjectivity of an analyzer is excessively involved. Even when the same vulnerability identification results for the same system are provided and the scoring of the results is requested, analyzers calculate different scores because they determine the weights of various types of vulnerability to be different.

Due to the above-described problems, the results of analyzing or evaluating vulnerability have low objectivity, and the analyzer cannot help modifying the results because of lack of a logical basis upon which the analyzer can refute the request to modify the results.

Accordingly, there is an urgent need for technology that can quantify the level of a system using a numerical value and transfer the information.

DISCLOSURE

Technical Problem

Accordingly, the present invention has been made keeping in mind the above problems occurring in the prior art, and an object of the present invention is to provide an apparatus and method that quantify the vulnerability of a system in order to intuitively and objectively represent the state of the system.

Technical Solution

According to an aspect of the present invention, there is provided a method of quantifying the vulnerability of a system, including converting each of the vulnerability identification results of the system into a vulnerability score so that the corresponding vulnerability identification results of the system can be applied to calculation of scores; calculating a target organization security level score corresponding to the system based on a technology-field security level score and a management-field security level score among the vulnerability scores; converting status of a local network of the system being separated from an external network into a network separation score; calculating an interim score based on the target organization security level score and the network separation score; and quantifying the vulnerability of the system by finally calculating a composite score of the system using the interim score and a simulated intrusion success level.

Calculating the target organization security level score may include calculating the target organization security level score by adding the technology-field security level score and the management-field security level score based on set rates, respectively.

Calculating the target organization security level score may include converting technology-related vulnerability results, selected from among the vulnerability identification results of the system, into the technology-field security level score; and converting management-related vulnerability results, selected from among the vulnerability identification results of the system, into the management-field security level score.

Converting into the technology-field security level may be performed using the sum of scores corresponding to the technology-related vulnerability results and the sum of the vulnerability scores.

Converting into the management-field security level score may be performed using the sum of scores corresponding to the management-related vulnerability results and the sum of the vulnerability scores.

The method may further include, before calculating the composite score of the system, combining vulnerability results corresponding to the respective vulnerability identification results of the system, and attempting simulated intrusions along a plurality of paths based on the combined vulnerability results; and calculating the simulated intrusion success level according to an intrusion attempt location and intrusion results of a successful simulated intrusion.

Quantifying the vulnerability of the system may include calculating the composite score by applying a weight to the interim score according to the simulated intrusion success level.

According to an aspect of the present invention, there is provided an apparatus for quantifying vulnerability of a system, including a vulnerability calculation unit configured to convert each of the vulnerability identification results of the system into a vulnerability score so that the corresponding vulnerability identification results of the system can be applied to calculation of scores; a target organization security level calculation unit configured to calculate a target organization security level score corresponding to the system based on a technology-field security level score and a management-field security level score among the vulnerability scores; a network separation status calculation unit configured to convert the status of the local network of the system being separated from an external network into a network separation score; an interim calculation unit configured to calculate an interim score based on the target organization security level score and the network separation score; and a final score calculation unit configured to quantify the vulnerability of the system by finally calculating a composite score of the system using the interim score and a simulated intrusion success level.

The target organization security level calculation unit may calculate the target organization security level score by adding the technology-field security level score and the management-field security level score based on set rates, respectively.

The apparatus may further include a technology-field security level calculation unit configured to convert technology-related vulnerability results, selected from among the vulnerability identification results of the system, into the technology-field security level score; and a management-field security level calculation unit configured to convert management-related vulnerability results, selected from among the vulnerability identification results of the system, into the management-field security level score.

The apparatus may further include a level management unit configured to combine vulnerability results corresponding to the respective vulnerability identification results of the system, to attempt simulated intrusions along a plurality of paths based on the combined vulnerability results, and to calculate the simulated intrusion success level according to an intrusion attempt location and intrusion results of a successful simulated intrusion.

The final score calculation unit may calculate the composite score by applying a weight to the interim score according to the simulated intrusion success level.

Advantageous Effects

According to the present invention, the apparatus and method for quantifying the vulnerability of a system can minimize the involvement of the subjectivity of an evaluator, thereby overcoming the problem that evaluation results vary depending on the evaluator.

Furthermore, the apparatus and method for quantifying the vulnerability of a system can provide a system administrator with intuitive and objective results, such as the result statement "if a specific protective measure is taken, the composite score can be increased by specific points."

DESCRIPTION OF DRAWINGS

FIGS. 2 to 4 are reference diagrams that are applied to the apparatus for quantifying the vulnerability of a system according to the embodiment of the present invention.

MODE FOR INVENTION

Figure 1:
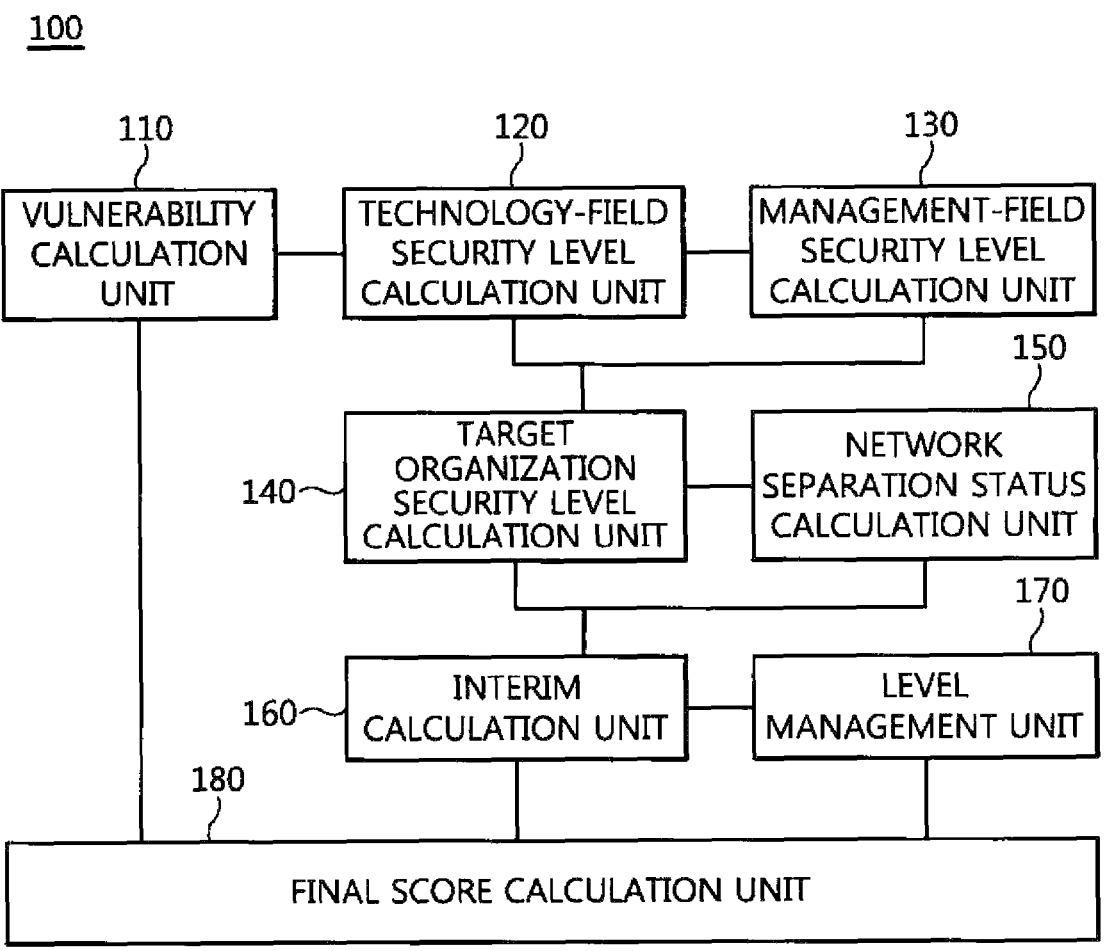
FIG. 1 is a diagram schematically illustrating the configuration of an apparatus for quantifying the vulnerability of a system according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

An apparatus and method for quantifying the vulnerability of a system according to embodiments of the present invention will be described in detail below with reference to the accompanying drawings.

FIG. 1 is a diagram schematically illustrating the configuration of an apparatus 100 for quantifying the vulnerability of a system according to an embodiment of the present invention. FIGS. 2 to 4 are reference diagrams that are applied to the apparatus for quantifying the vulnerability of a system according to the embodiment of the present invention.

The apparatus 100 for quantifying the vulnerability of a system may include the results of analyzing or evaluating the vulnerability of the system (hereinafter referred to as "the vulnerability identification results of the system") or receive them from the outside, but is not limited thereto.

Referring to FIG. 1, the apparatus 100 for quantifying the vulnerability of a system includes a vulnerability calculation unit 110, a technology-field security level calculation unit 120, a management-field security level calculation unit 130, a target organization security level calculation unit 140, a network separation status calculation unit 150, an interim calculation unit 160, a level management unit 170, and a final score calculation unit 180.

The vulnerability calculation unit 110 converts each of the vulnerability identification results of the system into a vulnerability score so that the vulnerability identification results of the corresponding system can be applied to the calculations of scores. Here, each of the vulnerability scores may be represented, for example, by a score in the range from 0 to 10.

For example, the vulnerability identification results of a server and a web application program may be calculated based on Common Vulnerability Scoring System (CVSS) 2.0, and the vulnerability identification results of a management field, a network, and a DB field may be calculated using a separate method.

The technology-field security level calculation unit 120 calculates a technology-field security level score by integrating technology-related vulnerability results selected from among the vulnerability identification results of the system. In this case, the technology-related vulnerability results are the results of analyzing and evaluating the vulnerability of the technical parts of the system.

More specifically, the technology-field security level calculation unit 120 may calculate the technology-field security level score using the following Equation 1:

$$\text{Technology-field security level score} = 100 - (\text{technology-related vulnerability result score/maximum vulnerability score}) * 100 \quad (1)$$

In Equation 1, the technology-related vulnerability result score is obtained by converting the technology-related vulnerability results into a score, and the maximum vulnerability score is the sum of vulnerability scores corresponding to the vulnerability identification results of the system. For example, it is assumed that system A is a Unix server and the sum of vulnerability scores corresponding to the results of analyzing or evaluating the vulnerability of the Unix server is 1000. Assuming that the sum of technology-related vulnerability result scores of the Unix server is 80, the technology-field security level score of the system A is 92 according to Equation 1.

The management-field security level calculation unit 130 calculates a management-field security level score by integrating management-related vulnerability results selected from among the vulnerability identification results of the system. In this case, the management-related vulnerability results are the result of analyzing and evaluating vulnerability related to the management of the system. More specifically, the management-field security level calculation unit 130 may calculate the management-field security level score using the following Equation 2:

$$\text{Management-field security level score} = 100 - (\text{management-related vulnerability result score/maximum vulnerability score}) * 100 \quad (2)$$

In Equation 2, the maximum vulnerability score is the same as the maximum vulnerability score of Equation 1, and is the sum of vulnerability scores corresponding to the vulnerability identification results of the system.

The target organization security level calculation unit 140 calculates a target organization security level score by adding the technology-field security level score and the management-field security level score based on rates $\alpha$ and $\beta$, respectively. In this case, the set rates, that is, the rate to be applied to the technology-field security level score and the rate to be applied to the management-field security level score, are set such that the sum ($\alpha+\beta$) thereof is 1.

The target organization security level score may be calculated using the following Equation 3:

$$\text{Target organization security level score} = (\text{technology-field security level score} * \alpha) + (\text{management-field security level score} * \beta) \quad (3)$$

The network separation status calculation unit 150 converts the status of the local network of the system being separated from an external network, for example, the Internet, into a network separation score.

For example, in government offices and public institutions, there are cases in which a local network over which staff members perform their tasks is separated from an external network via which the Internet can be used In this case, the network separation status calculation unit 150 may assign network separation scores according to the status of the local network being separated from the external network (see the network separation status of FIG. 2), as illustrated in FIG. 2.

The interim calculation unit 160 calculates an interim score by adding the target organization security level score and the, network separation score based on a set rate $\gamma$.

The level management unit 170 calculates a simulated intrusion success level by combining vulnerability results corresponding to the vulnerability identification results of the system and applying the combined vulnerability results to simulated intrusions along a plurality of paths.

More specifically, the level management unit 170 combines vulnerability results corresponding to the vulnerability identification results of the system, and attempts simulated intrusions along a plurality of paths. Thereafter, the level management unit 170 calculates a simulated intrusion success level according to the intrusion attempt location and intrusion results of a successful simulated intrusion. For example, the level management unit 170 may calculate a simulated intrusion success level according to the intrusion attempt location and intrusion results of a successful simulated intrusion, as illustrated in FIG. 3. In this case, the intrusion results may include the acquisition of an administrator authority, the acquisition of general user authority, and the obstruction of the normal operation of the system attributable to a simulated intrusion, and the intrusion attempt location may include an external location (the Internet), another system in an organization in which the former system exists, and the same system.

The final score calculation unit 180 calculates a composite score by applying the simulated intrusion success level to the interim score. More specifically, the final score calculation unit 180 calculates a composite score by applying weight $\delta$ ($\in\{80\%, 85\%, 90\%, 95\%, 100\%\}$) to the interim score according to the simulated intrusion success level. For example, the final score calculation unit 180 may calculate a composite score based on the simulated intrusion success level if the interim score is 94, as illustrated in FIG. 4.

Next, a method of quantifying the vulnerability of a system will be described in detail with reference to FIG. 5.

Figure 5:
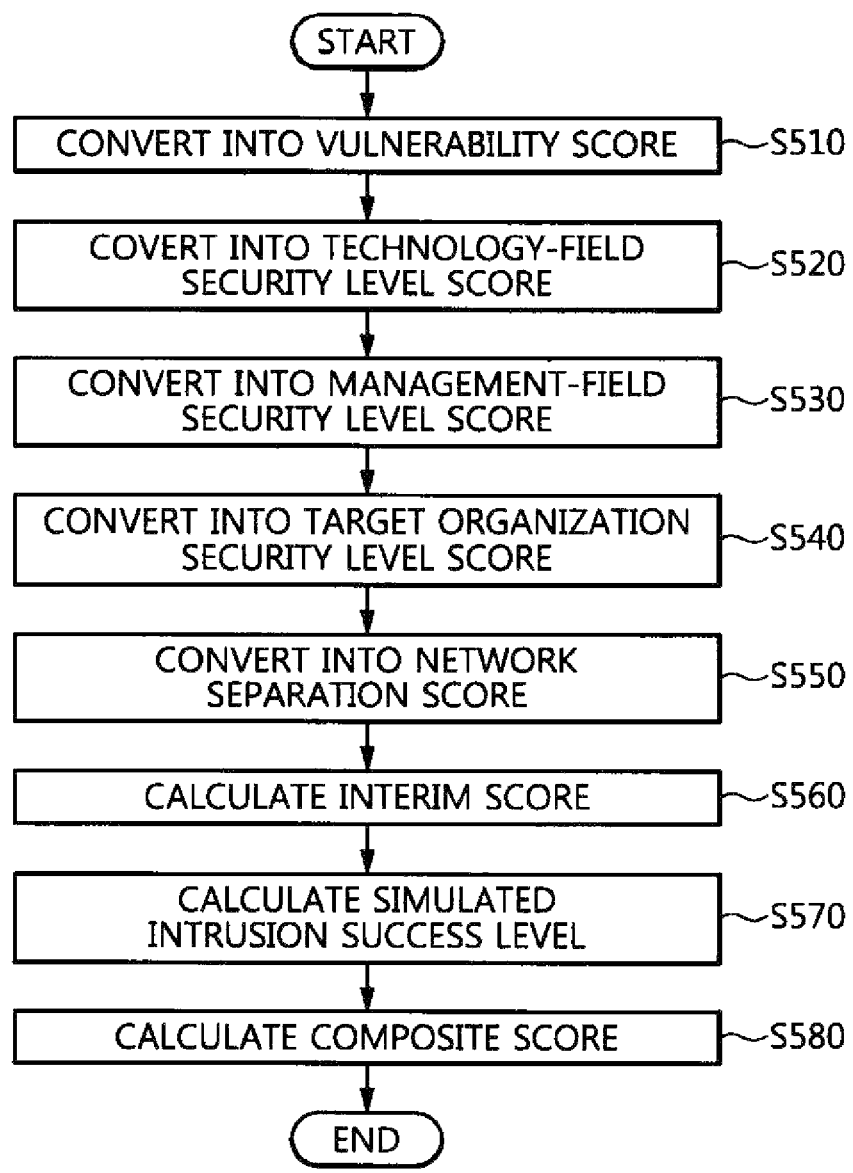
FIG. 5 is a flowchart illustrating a method of quantifying the vulnerability of a system according to an embodiment of the present invention.

FIG. 5 is a flowchart illustrating a method of quantifying the vulnerability of a system according to an embodiment of the present invention.

Referring to FIG. 5, the apparatus 100 for quantifying the vulnerability of a system converts the vulnerability identification results of the system into vulnerability scores at step S510. In this case, each of the vulnerability scores may be represented by, for example, a score in the range from 0 to 10.

The apparatus 100 for quantifying the vulnerability of a system calculates a technology-field security level score by integrating technology-related vulnerability results selected from among the vulnerability identification results of the system at step S520. At step S520, the technology-field security level score may be calculated by Equation 1.

The apparatus 100 for quantifying the vulnerability of a system calculates a management-field security level score by integrating management-related vulnerability results selected from among the vulnerability identification results of the system at step S530. At step S530, the management-field security level score may be calculated by the Equation 2.

The apparatus 100 for quantifying the vulnerability of a system calculates a target organization security level score by adding the technology-field security level score and the management-field security level score based on set rates $\alpha$ and $\beta$, respectively, at step S540. In this case, the set rates, that is, the rate to be applied to the technology-field security level score and the rate to be applied to the management-field security level score, are set such that the sum ($\alpha+\beta$) thereof is 1. At step S540, the target organization security level score may be calculated by Equation 3.

The apparatus 100 for quantifying the vulnerability of a system converts the status of the local network of the system being separated from an external network, for example, the Internet, into a network separation score at step S550. In this case, the apparatus 100 for quantifying the vulnerability of a system may assign a network separation score according to the status of the local network of the system being separated from the external network, as illustrated in FIG. 2. The apparatus 100 for quantifying the vulnerability of a system calculates an interim score by adding the target organization security level score and the network separation score based on a set rate $\gamma$ at step S560.

The apparatus 100 for quantifying the vulnerability of a system combines vulnerability results corresponding to the vulnerability identification results of the system, attempts simulated intrusion along a plurality of paths, and calculates a simulated intrusion success level according to the intrusion attempt location and intrusion results of a successful simulated intrusion at step S570. In this case, the apparatus 100 for quantifying the vulnerability of a system may calculate a simulated intrusion success level according to the intrusion attempt location and the intrusion results, as illustrated in FIG. 3.

The apparatus 100 for quantifying the vulnerability of a system calculates a composite score by applying the simulated intrusion success level to the interim score at step S580, thereby quantifying the vulnerability of the system.

As described above, the apparatus 100 for quantifying the vulnerability of a system according to an embodiment of the present invention quantifies the results of analyzing or evaluating the vulnerability of a system, thereby intuitively and objectively representing the state of the system.

Although the specific embodiments of the present invention have been disclosed for illustrative purposes, those skilled in the art will appreciate that various modifications, additions and substitutions are possible without departing from the scope and spirit of the invention as disclosed in the accompanying claims.

The invention claimed is:

1. A method of quantifying vulnerability of a system, comprising:

converting each of a plurality of vulnerability identification results of the system into a vulnerability score so that corresponding vulnerability identification results of the system can be applied to calculation of scores;

calculating a target organization security level score corresponding to the system based on a technology-field security level score and a management-field security level score among the vulnerability scores;

converting status of a local network of the system being separated from an external network into a network separation score;

calculating an interim score based on the target organization security level score and the network separation score; and quantifying the vulnerability of the system by finally calculating a composite score of the system using the interim score and a simulated intrusion success level, wherein calculating the target organization security level score includes:

converting technology-related vulnerability results, selected from among the plurality of vulnerability identification results of the system, into the technology-field security level score; and converting management-related vulnerability results, selected from among the vulnerability identification results of the system, into the management-field security level score, and wherein converting technology-related vulnerability results into the technology-field security level score is performed using a sum of scores corresponding to the technology-related vulnerability results and a sum of the vulnerability scores.

2. The method of claim 1, wherein calculating the target organization security level score includes calculating the target organization security level score by adding the technology-field security level score and the management-field security level score based on set rates, respectively.

3. The method of claim 1, wherein converting management-related vulnerability results into the management-field security level score is performed using a sum of scores corresponding to the management-related vulnerability results and a sum of the vulnerability scores.

4. The method of claim 1, further comprising, before calculating the composite score of the system:

combining vulnerability results corresponding to the vulnerability identification results of the system, and attempting simulated intrusions along a plurality of paths based on the, combined vulnerability results; and calculating the simulated intrusion success level according to an intrusion attempt location and intrusion results of a successful simulated intrusion.

5. The method of claim 1, wherein quantifying the vulnerability of the system includes calculating the composite score by applying a weight to the interim score according to the simulated intrusion success level.

6. An apparatus for quantifying vulnerability of a system, comprising:

a vulnerability calculation unit configured to convert each of a plurality of vulnerability identification results of the system into a vulnerability score so that corresponding vulnerability identification results of the system can be applied to calculation of scores;

a target organization security level calculation unit configured to calculate a target organization security level score corresponding to the system based on a technology-field security level score and a management-field security level score among the vulnerability scores;

a network separation status calculation unit configured to convert status of a local network of the system being separated from an external network into a network separation score;

an interim calculation unit configured to calculate an interim score based on the target organization security level score and the network separation score;

a final score calculation unit configured to quantify the vulnerability of the system by finally calculating a composite score of the system using the interim score and a simulated intrusion success level;

a technology-field security level calculation unit configured to convert technology-related vulnerability results, selected from among the vulnerability identification results of the system, into the technology-field security level score; and a management-field security level calculation unit configured to convert management-related vulnerability results, selected from among the vulnerability identification results of the system, into the management-field security level score, wherein the technology-field security level calculation unit converts technology-related vulnerability results, selected from among the plurality of vulnerability identification results of the system, into the technology-field security level score by using a sum of scores corresponding to the technology-related vulnerability results and a sum of the vulnerability scores.

7. The apparatus of claim 6, wherein the target organization security level calculation unit calculates the target organization security level score by adding the technology-field security level score and the management-field security level score based on set rates, respectively.

8. The apparatus of claim 6, further comprising a level management unit configured to combine vulnerability results corresponding to respective vulnerability identification results of the system, to attempt simulated intrusions along a plurality of paths based on the combined vulnerability results, and to calculate the simulated intrusion success level according to an intrusion attempt location and intrusion results of a successful simulated intrusion.

9. The apparatus of claim 6, wherein the final score calculation unit calculates the composite score by applying a weight to the interim score according to the simulated intrusion success level.

* * * * *